United States Patent
Maillard et al.

(10) Patent No.: US 6,807,675 B1
(45) Date of Patent: *Oct. 19, 2004

(54) APPARATUS AND METHOD FOR SELECTING VIEWERS' PROFILE IN INTERACTIVE TV

(75) Inventors: Alain Maillard, Paris (FR); Laurent Lesenne, Acigné (FR); Nadine Patry, Rennes (FR)

(73) Assignee: Thomson Licensing S.A., Boulogne-Billancourt (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,286

(22) Filed: Jun. 3, 1999

(30) Foreign Application Priority Data

Jun. 5, 1998 (EP) .............................................. 98401354

(51) Int. Cl.⁷ ........................... H04N 7/025; H04N 7/10
(52) U.S. Cl. .............................. 725/35; 725/34; 725/24; 725/136
(58) Field of Search ............................. 725/23, 24, 46, 725/35, 136, 34, 9, 13, 14, 20

(56) References Cited

U.S. PATENT DOCUMENTS

| | | | | |
|---|---|---|---|---|
| 4,602,279 A | * | 7/1986 | Freeman ....................... | 725/35 |
| 5,446,919 A | * | 8/1995 | Wilkins ....................... | 725/35 |

(List continued on next page.)

FOREIGN PATENT DOCUMENTS

| | | | | |
|---|---|---|---|---|
| EP | 0777385 A2 | 6/1997 | .......... | H04N/7/173 |
| EP | 0822718 A1 | 2/1998 | .......... | H04N/7/173 |
| WO | 94/13107 | 6/1994 | .......... | H04N/7/16 |
| WO | 97/17774 | 5/1997 | .......... | H04B/17/00 |
| WO | 97/22074 | 6/1997 | .......... | G06F/17/60 |
| WO | 98/03016 | 1/1998 | .......... | H04N/7/16 |
| WO | WO 9926415 A1 * | 5/1999 | .......... | H04N/7/10 |

OTHER PUBLICATIONS

EPO Search Report.

*Primary Examiner*—John Miller
*Assistant Examiner*—Scott Beliveau
(74) *Attorney, Agent, or Firm*—Joseph S. Tripoli; Ronald H. Kurdyla; Joel M. Fogelson (57) ABSTRACT

The interactive multimedia devices is based on network structures involving: a broadcasting network (120) and a return path network (140). On the broadcasting network, the interactive data are multiplexed with the broadcast audiovisual signals so as to offer interactivity to connected end-users on the return path network. To address specific sociological profiles, and to save bandwidth, a plurality of filters, let's say a number N, is associated with a single interactive application. In such case, the comparison continues until one of the N filters match the profile stored in the terminal permanent memory. If one of the filters matches the viewer's profile, the interactive application is executed, else the application is ignored. In this way, a plurality of categories of viewers can interact. A plurality of filters can be associated with an interactive application with different contents. To each filter corresponds a content. These contents are displayed if the corresponding filters match the viewer's profile.

16 Claims, 3 Drawing Sheets

U.S. PATENT DOCUMENTS

| | | | |
|---|---|---|---|
| 5,602,920 A | | 2/1997 | Bestler et al. ................. 380/49 |
| 5,721,583 A | * | 2/1998 | Harada et al. ................. 725/24 |
| 5,855,008 A | * | 12/1998 | Goldhaber et al. ........... 705/14 |
| 5,900,905 A | * | 5/1999 | Shoff et al. .................. 709/219 |
| 5,905,865 A | * | 5/1999 | Palmer et al. .............. 725/112 |
| 5,915,243 A | * | 6/1999 | Smolen ........................ 725/23 |
| 5,918,014 A | * | 6/1999 | Robinson .................... 709/219 |
| 5,929,850 A | * | 7/1999 | Broadwin et al. .......... 725/110 |
| 5,978,381 A | * | 11/1999 | Perlman et al. ............. 370/432 |
| 6,029,195 A | * | 2/2000 | Herz ........................... 725/116 |
| 6,085,229 A | * | 7/2000 | Newman et al. ............ 709/203 |
| 6,160,570 A | * | 12/2000 | Sitnik ............................ 725/9 |
| 6,182,050 B1 | * | 1/2001 | Ballard ........................ 705/14 |
| 6,285,407 B1 | * | 9/2001 | Yasuki et al. ................ 348/460 |
| 6,298,482 B1 | * | 10/2001 | Seidman et al. ............... 725/46 |
| 6,324,519 B1 | * | 11/2001 | Eldering ....................... 705/14 |
| 6,330,610 B1 | | 12/2001 | Docter et al. ............... 709/229 |
| 6,345,289 B1 | | 2/2002 | Lotspiech et al. .......... 709/203 |
| 6,442,598 B1 | * | 8/2002 | Wright et al. ............... 709/217 |

\* cited by examiner

FIG. 5 ns within interactive multimedia systems and more particularly to an apparatus and a method for selecting a category of viewers in an interactive multimedia system that can be dedicated to interactive TV.

APPARATUS AND METHOD FOR SELECTING VIEWERS' PROFILE IN INTERACTIVE TV

FIELD OF THE INVENTION

The present invention relates to information communications within interactive multimedia systems and more particularly to an apparatus and a method for selecting a category of viewers in an interactive multimedia system that can be dedicated to interactive TV.

DESCRIPTION OF THE RELATED ART

The exchanges of information according to an environment of interactive multimedia devices involve at least a broadcaster and a plurality of multimedia terminals linked to the broadcaster by a communication network.

A structure for exchanging audiovisual information and service information between a transmitter and an interactive multimedia terminal generally includes a direct path, via which the interactive audiovisual programs and services associated therewith are transmitted and a return path via which one or more terminals can communicate interactively with said transmitter. The direct path includes, in the case of an analog transmission, a modulator enabling information of the Teletext type for example to be inserted into the frame return lines (VBI: vertical blanking interval) of an analog video signal. In the case of a digital transmission, a data insertion unit allows the time-division multiplexing of packets of audio and video data, service data and private data for example according to the MPEG-2 standard.

Figure 1:
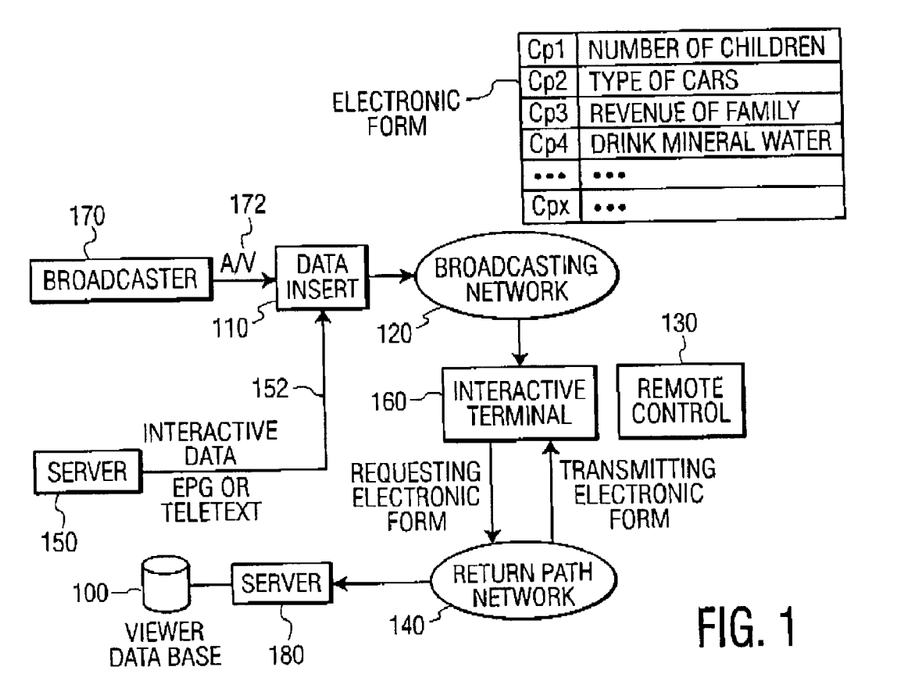
FIG. 1 represents a n environment wherein the pre sent invention is implemented.

Such environment is similar to FIG. 1. The interactive services are associated with broadcast audiovisual TV programs.

Basically, in the prior art, the environment of interactive multimedia devices is based on networks structure involving:

a broadcasting data path (120) also called "broadcasting network" which is multiplexed with the broadcast audiovisual signal; and a return path (140) on a telephone line or a cable to offer interactivity to connected end-users. As is shown in this FIG. 1, the return path may be a telephone or a cable network.

The broadcasting data path (120) is simply connected to a data insertion unit (110) which receives A/V signals and interactive data on one side, and to an interactive terminal (160) on the other side. In the same way, the return path (140) is connected to a server (180) on one side and to the interactive terminal (160) on the other side.

Interactivity provided to all viewers can generate the following disagreements:

If the interactivity option is proposed and if it is very attractive for the targeted viewers, then overflow or jam of the return path can occur in the return path network such as telephone network, especially in prime time;

Conversely during a vote or a commercial, viewer having a wrong profile contribute to overflow the return path and block the viewers with the targeted profile to participate.

The efficiency and the quality of the interactive service may be jeopardized by a great number of viewers whose profiles do not fit with the desired objectives.

The data rate available to broadcast information multiplexed with audiovisual signals is limited to few thousands bits per second. Solutions consisting in selected terminals by their physical address generate a quantity of data that saturates the data bandwidth.

Furthermore, another constraint should be taken into account according to which providers have expressed their desire to focus a specific message to a specific population.

For example, an advertisement agency would like to design an interactive advertisement but would like to restrict the access to the interactivity option for a selected population. They want to restrict the interactivity to viewers having the sociological profile corresponding to people targeted by the message included in the advertisement or audiovisual program.

A pending European patent application numbered 97 403044.7 relating to "a process for controlling the communication flow within an interactive network" owned by Thomson Multimedia, describes a process wherein during each interactive program, a group of data is sent to each terminal. The group of data is intended to set up a protocol for establishing interactive communications between a transmission station and the terminals. This process is implemented in the same environment as the one of the present invention.

A U.S. Pat. No. 4,602,279 discloses "a method for providing targeted profile interactive CATV displays" to be used for an interactive communications system such as an interactive cable television system. This method aims to interactively create a selection profile for a subscriber and to interactively select in real time one of a plurality of messages based upon the selection profile whereby multiple users of a one-way television signals distribution network may obtain an individualized or tailored program information content for a television programming sequence. But according to this technique, no method is provided to implement it for the viewer's selection on the terminal side, which is the main drawback. Besides, the requested data are not accurate and easily processed so as to update the data. There is no homogeneity of the installed base terminal, no quantification of the terminal having the targeted profile; and no method described for a multi-criteria selection. In addition, this technique is directed to the use of 4 channels broadcasting whereas the present invention can be implemented with a single channel broadcasting.

There is an additional problem which is the short time reaction in this interactive selection and response. Solutions exist in digital TV to address a particular subscriber. Each multimedia terminal or digital set-top-box (STB) is referenced by an address. Each time a message is sent through the satellite network to a restricted number of set-top-boxes, the broadcast message is concatenated with addresses of each STB concerned. For instance, a message addressed to 1 million subscribers is associated to 1 million addresses.

In this particular example, 1 million subscribers means that it requires to have an address of at least 20 bits. Therefore, we need 20 millions bits to broadcast which corresponds a file of 2,5 Mbytes. Considering a bandwidth of 9600 bit/s dedicated to interactive data, it will take 2083 seconds (or 35 minutes) to address each interactive terminal.

In the case of viewer's profile given by the subscription form, it is quite easy to extract the correct STB's addresses from the subscriber's or viewer's database and to broadcast them multiplexed with the audiovisual program.

However, targeted applications require a short time reaction from the viewer and the audiovisual program that is concerned (few seconds for a commercial), it hardly ever exceed a minute. Consequently, the 35 minutes required to address all interactive terminals is inapplicable.

SUMMARY OF THE INVENTION

It is an object of the present invention to homogenize the information provided by the viewers by requesting criteria information according to a standardized format to be stored in the terminals and in the service provider viewer database.

It is another object of the invention to process the criteria information so as to enable to classify the viewers in different categories and to target them more accurately and more efficiently.

It is thus another object of the invention to select a specific terminal or a category of viewers by using their profiles and not by using their physical addresses.

It is a further object of the invention to react in a very short time in an interactive application mainly for commercial purposes.

To have access to the interactive services, viewer has to register himself at the interactive service providers. At the registration phase, the viewer fills in a form giving some criteria corresponding to his profile such as his age, job, single, married, gender, number of children, age of children, etc.

The viewer's registration can be done by the viewer:
either by filling an electronic form displayed on the terminal screen and when this registration is validated by the viewer, the information is transmitted via a network to the service provider viewers database;
either by filling a paper form. This paper form is sent by mail to the service provider who updates the service provider viewer database;
either by calling a telephone operator who directly fills the form according to the information given by the viewer and then sends the criteria information to the service provider viewer database.

The form and thus the types of criteria are the same for all viewers, which assures the homogeneity of the information stored in the terminals that constitutes the installed-terminal-basis. By filling the form, the viewer selected one of the possible values of each proposed criteria.

Further to the viewer's terminal installation, the criteria are stored into the terminal permanent memory. This stored criteria can be updated each time new criteria information are provided by the registered viewer.

In order to address specific sociological profile, and to save bandwidth, a filter is attached to the digital data multiplexed with the audiovisual signal. The filter is a combination of a criteria set and a script. Then, each operational interactive terminal receives the digital data with a filter attached. Each interactive terminal demultiplexes digital information from the audiovisual signal using the existing techniques as for example EPG, Teletext and reads the filter attached to the digital data. The interactive terminal applies the script of the filter to the criteria included in the filter and to the criteria programmed during the installation phase. If the result of this operation is positive then the interactive terminal takes the decision to authorize the access to the digital data previously associated to the filter. Otherwise, the digital data are discarded.

In the service operation, the operator or his clients have the possibility to associate at least one filter by interactive application in order to target or address a predefined sub-group of registered viewers. A filter is composed of a set of values corresponding viewers criteria dictionary. The criteria dictionary is the list of predefined criteria which constitute the database.

When an application is broadcast with at least one associated filters, the terminal "compare" the received filter(s) to the profile stored in the terminal permanent memory. This comparison consists in applying the script of the filter to the criteria included in the filter and to the criteria included in the stored profile If the comparison is positive then the application is executed by the terminal. Thus, the application is accessible only by the predefined subgroup. The other subgroups cannot have access to the application. This implementation concerns the case where a filter is associated with a single interactive application.

Therefore, according to the present invention, the method for selecting a category of viewers in an interactive multimedia system comprising a plurality of interactive terminals, each one containing a memory that stores a viewer's profile, a broadcasting network and a return path network, the broadcasting network receiving Audio/Video data and interactive data, wherein the interactive data can be executed so as to return back a signal on the return path network; the method comprises the steps of:

receiving audio/video data multiplexed with a filter data corresponding to the selected category of viewers;
comparing the received filter data to the viewer's profile stored in the interactive terminal memory; and
responsive to the comparison, executing the interactive data so as to allow an interactive connection or discarding the received filter data.

In another implementation, a plurality of filters, let's say a number N, is associated with a single interactive application. In such case, the comparison continues until one of the N filters match the profile stored in the terminal permanent memory. If one of the filters matches the profile, the interactive application is executed else the application is ignored.

In another improvement, a plurality of filters is associated with an interactive application with different contents or whose content is variable. Each filter is attached to a content. One of the content is considered as a default content in case no filter matches the terminal profile. Each of the other contents has its own specific condition and it is displayed if the corresponding filter matches the profile stored in the terminal permanent memory.

According to the present invention, an apparatus for selecting viewer's profile can be used in connection with the above mention method.

Furthermore, the solution brought by the present invention is independent from the type of network no matter a terrestrial, an analog or digital satellite, an analog or digital cable is used.

BRIEF DESCRIPTION OF THE DRAWINGS

Other characteristics and advantages of the invention will emerge from the description of some embodiments taken by way of non-limiting examples with reference to the appended figures.

DETAILED DESCRIPTION OF THE INVENTION

As is shown in FIG. 1, the interactive TV environment involves at least a broadcaster (170) associated to a server (150) on one side and at least an interactive terminal (160). Both sides are connected through by two networks: the broadcasting network and the return path network.

The broadcasting network (120) is connected on one side to a data insertion unit (110) which receive s the Audio/Video signals (172) from a broadcaster (170) and interactive data, electronic program guide or Teletext data (152) from a first server (150). On the other side, the broadcasting network is connected to a plurality of interactive terminals (160) controlled by a remote control or keyboard (130) of the viewer.

Conversely, the return path network (140) is composed of a plurality of lines that connect the interactive terminals (160) to a second server (180). This second server (180) manages and controls a service provider's viewer database (100). There are several databases but one is dedicated to the viewer database.

In digital and analog environment, the data insertion unit (110) includes a synchronization function which allows the synchronization of the audio, video and data. But, more specifically, in an Analog TV environment, the data insertion unit (110) is an equipment which performs the insertion of digital data in an audiovisual signal. Such equipment is particularly used for the insertion of Teletext or EPG information in VBI lines (Video Blanking Interleaves) of an analog channel. In Digital TV, the data insertion unit (110) is an equipment which multiplexes simple logical digital bit streams into a format that complies to the transport MPEG-2 bit stream. A simple logical bit stream can be for instance a video, audio or data bit stream.

Concerning the interactive terminal (160), this latter is for instance a multimedia terminal allowing the interpretation and delivery of audiovisual information and digital data. This terminal includes a display for visual information, loudspeakers for audio information, a demodulator for cable and/or for digital satellite and/or for terrestrial network dedicated to the reception of the broadcast signal, a modem for cable and/or for Public Switching Network dedicated to the return path, a digital calculator for the system control, an OSD for the insertion of message and graphs on video displays and an IR. remote control and/or a keyboard. The system control of the multimedia terminal is similar to the one of a personal computer, it is for instance a microprocessor to which are added a RAM, a ROM, an EPROM or a Flash PROM with an IR. peripheral and any other peripherals.

The interactive terminal has a programmable memory such as a Flash EPROM or E2PROM to save a configuration. This configuration may be programmed either by the manufacturers or by the retailers, or by the service providers via the cable or telephone network. In addition, according to the present invention this terminal can be partly programmed by the viewer himself through an electronic registration form display onto the terminal screen. The configuration can be programmed and updated at anytime via the network or by the viewer himself depending on the implementation of the registration process. The configuration includes at least the registration number of the viewer (so-called viewer Id or personal Identifier) and a Terminal Identifier. The configuration shall be completed by the viewer profile further to his registration.

In general, this interactive terminal or multimedia terminal (160) can be physically a personal computer, a TV set associated with a connected Set-Top-Box or a TV set with all the features listed above embedded in excepted the remote control.

The remote control is a usual remote control generally delivered with a TV set with a special key or a plurality of keys dedicated to Interactivity. During an interactive program or clip, a logotype or a message appears on the display which invites the viewer to participate and to react. By pressing one or more of these special keys, the viewer has access to the interactivity function proposed. This interactivity function is for instance a vote, a game choice, a brochure command, a survey, etc.

More generally, the services offered by such system are:
f

- Interactive commercials (extra information, coupon by mail, brochure by mail etc.)
- Games, Quiz show
- Contest: vote
- Gambling
- Request for Extra information regarding a program (car races, basket ball, movies)
- EPG, Game result, Weather, etc.

According to the present invention, the second server (180) is a logical entity which can include one or more physical server computers in communication through a data network and which has the main following functions:

1) The server manages the database where all viewer registration forms are stored. Further to a registration of a new viewer, his profile is stored in this database. His profile may contain sociological data and any other data that enable to classify the viewers into the appropriate categories. Once the criteria given by the registered viewer are recorded in database of the service provider, the criteria are associated to the Viewer Identifier (Viewer Id.) and to the Terminal Identifier (Terminal Id.).
2) The second server (180) manages communications received from the interactive terminals. It collects the information such as the viewer identifier or the terminal identifier and the message associated.
3) In some case, the second server sends information to the interactive terminal for its configuration at its own initiative, for instance for update purpose, or simply at the request of the viewer, for instance for registration.
4) Depending on the kind of network, the server manages the protocol of the communication which can be DTMF, voice, videotext, supra-voice, TCP/IP etc.

The viewer having access to the interactive services are registered in the database as a registered viewer or a "subscriber" by the service provider. In the registration form, some criteria representing the viewer profile have to be filled in, and are stored by the service provider. Therefore, each viewer is known by the interactive service provider and identified thanks to an identifier embedded in the interactive terminal (Viewer Id.). Each time a viewer reacts to a broadcast message appearing on the interactive terminal screen by pressing a key on the remote control, the viewer request is satisfied either locally thanks to data previously broadcast and available in the terminal memory, or thanks to a message which is sent to the interactive server via the return path network associated to the viewer Id.

Interactive services, offering interactivity through a return path network, insert in the broadcast message the telephone number (or the physical address) of the corresponding second server (180). Broadcast messages for interactivity or a part of the messages are stored in the terminal memory, and on viewer request, the telephone number (or the address) is read from the terminal memory and used to establish a communication with the interactive server. When the communication is established with the server, a data exchange begins.

Therefore, each time a particular profile is to be selected, a message dedicated to that type of profiles is broadcast. For example, the message corresponding to parents more than 30 years old with 2 children, is broadcast multiplexed with the audiovisual signals. This message is associated to a particular filter which contains the criteria more than 30 years old with 2 children. Thus, only families composed of parents who are more than 30 years old with 2 children will have access to the interactive application, to the digital data, etc.

Figure 2:
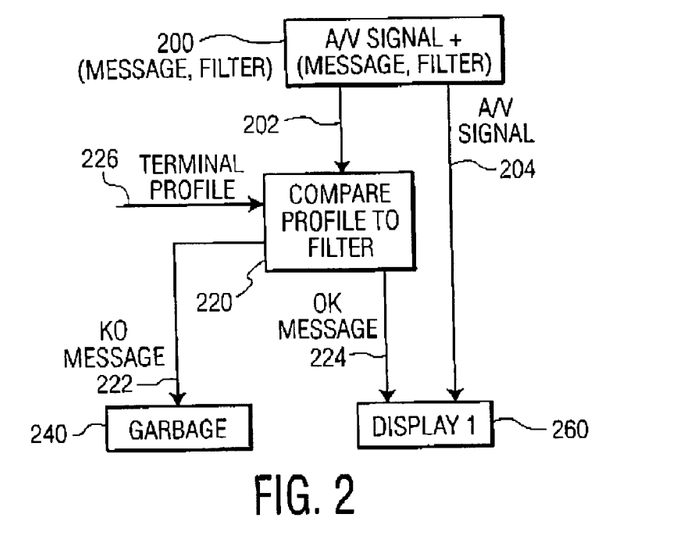
FIG. 2 shows a selection of a viewer's profile owing to a filter associated to the interactive terminal.

In FIG. 2, a basic procedure of selection of a viewer's profile or a plurality of viewer's profiles registered in the viewer database is illustrated. According to the present invention, each interactive terminal is associated to a profile.

The selection procedure starts by broadcasting the message multiplexed with the audiovisual signals to all interactive terminals that are tuned to the corresponding "channel" in the analog terminology or the corresponding "service" in the digital terminology. Afterwards, each interactive terminal demultiplexes the signals so as to separate the A/V signals (204) to be transmitted to the display from the message and the filter (202) to be compared to the profile (226) stored in the interactive terminal memory.

According to the result of the comparison, the message is either transmitted (224) to the display or discarded (222) in a garbage (240).

It should be kept in mind that this selection procedure concerns the case where a single message is to be displayed on the screen of the interactive terminal. Should there be a plurality of messages, a corresponding number of filters is to transmitted with the messages multiplexed with the A/V signals. After the comparison with the terminal profile, the message corresponding the filter that fits with the profile is displayed on the screen. The other messages are discarded.

In an improved implementation, an interactive application, a message or part of the interactive application or message can be associated with one or more filters. There are three different cases. The first and second cases concern the conditional application starting, meaning that only TV viewers whose profiles match the broadcast filter(s) have access to the broadcast application; and the third case concerns the conditional information posting, meaning that the same broadcast application may display different contents to the TV viewers according to the result of the matching process between the broadcast filter(s) and the stored profile.

The Conditional Application Starting

Case 1: One Filter for one Interactive Application

If the filter does not match the profile stored in the terminal permanent memory, then the interactive application is ignored (refer to FIG. 2), else the application is executed Case 2: A Plurality of Filters (N Filters) for one Interactive Application All the filters are tested successively so as to determine if it matches the profile stored in the terminal permanent memory. This procedure continue until one of the N filters matches the profile stored in the terminal or until all filter has been reviewed without success.

For instance, if filter 1 does not match the profile stored in the terminal, then the terminal check filter 2. Conversely, if filter 2 does not match the profile stored in the terminal then the terminal check the filter 3 etc.

If one the N filters match the profile stored in the terminal then the application is executed else the application is ignored.

The Conditional Information Posting

Figure 5:
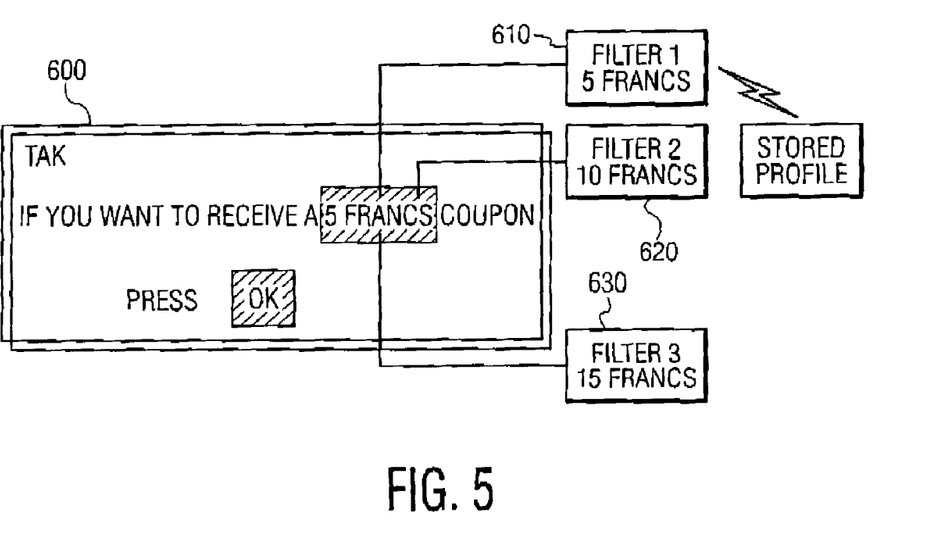
FIG. 5 shows another application of the present invention in a modifiable content depending on TV viewer's profile.

Case 3: A Plurality of Filters (N Filters) for one Interactive Application With Different Contents (N+1) An interactive application can include different contents with specific conditions linked to each content. The specific condition consists in having a filter attached to the content which is displayed if the filter matches the profile stored in the terminal. One of the content is considered as a default content in case no filter matches the Terminal profile. The additional content refers to the default content. This case is illustrated in FIG. 5 that will describe more in details later on.

Performance

Figure 3:
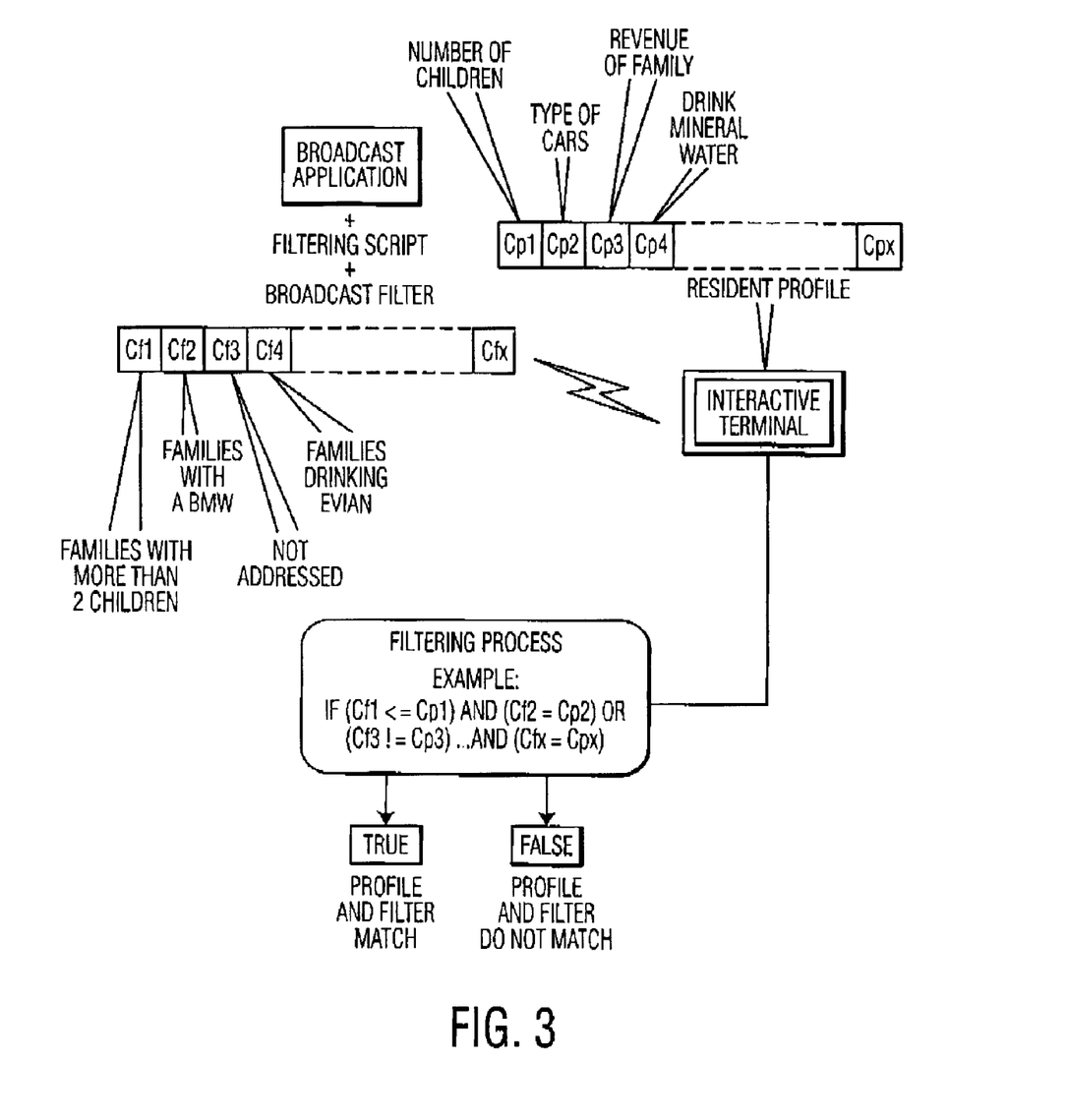
FIG. 3 shows a filtering process according to the present invention.

The simple example illustrated in FIG. 3 can be used to demonstrate the efficiency of any one of such procedure: the filter can be seen as a broadcast script applied between required broadcast criteria and stored criteria. To encode the calculation of FIG. 3 "if (Cf1<=Cp1) and (Cf2=Cp2) or (Cf3 !=Cp3) . . . and (Cfx=Cpx)", we can choose to encode each criterion and each operator used to compare broadcast and stored criteria (<=,=,!=, etc.) on one byte and to encode the and and the or operator on one bit. Thus, if we assume that 256 criteria can be used at the same time (x=256, which is over-estimated), each criterion having 256 different possible values, the filter can be compared to a file containing 256 bytes+256 bytes+32 bytes (255 bits)=544 bytes. With a bandwidth of 9600 bits/s, it takes a maximum of 0.46 second to broadcast the criteria file. According to the complexity of the script of the filter, the required bandwidth may increase because of the chosen coding but in the same time, the ability to express complex criteria increases too.

When receiving the filter, the interactive terminal makes the comparison with the criteria stored in the terminal permanent memory during the initialization phase and if the result is positive then the access is proposed to the viewer so as to let him interact in the interactive application. However, to be pragmatic, the panel is selected by choosing a limited number of criteria (less than 10) which reduces drastically the number of bytes to transmit and the bandwidth needed to broadcast the filter.

FIG. 3 shows the filter format and the filtering process in the case of one filter and one interactive application.

A profile is a list of criteria values. There is only one value per criteria and a criteria cannot have different values within the same profile. And each criterion in a profile can be classified into 2 categories: a qualitative criterion and a quantitative criterion.

qualitative criterion: can take different values without any mathematical relationship. For example, the Newspaper Read criterion can be associated to the values: New-York Times, Herald Tribune, Washington Post, USA Today, etc. There is specific order relationship between these criteria;

quantitative criterion or numerical criterion: can take a finite number of values for which an order relation can be applied lower than (<), greater than (>), equal to (=) or for which the interval notion makes sense. For example, the Age, the number of children belong to such category of criteria. Having 2 children is greater than having 1 child.

For the qualitative criterion, the operator applied between the filter and the corresponding value stored in the profile are limited to either:

=(equal to)<>(different from).

Conceding the quantitative criterion, the operator applied between the filter and the corresponding value stored in the profile can be either:

=(equal to), <>(different from), >(greater than),

<(lower than), >=(greater or equal to), <=(lower or equal to),

∈[ ](belongs to interval), ∉[ ](not belong to interval).

Therefore, a specific processing of these filters formats is performed. The filtering is processed by applying each part of the filter to the corresponding criterion of the terminal profile. Any expression can be used to perform the filtering process such as (F1 Op1 P1) AND (F2 Op2 P2) AND (F3 Op3 P3) AND . . . (Fx Opx Px). If the result is true, then the family profile corresponds to the defined criteria and is targeted by the Broadcaster of the Server. In this way, it is possible to select the viewers profile, for instance for a target family with at least 2 children AND owning a BMW car AND having no boat.

The filter format consists in having per filter a script of any complexity describing the targeted viewers categories:

(Cf1 Operator1 Cp1) Operator11 (Cf2 Operator2 Cp2) Operator12 (Cf3 Operator3 Cp3) . . .

where, Cf1 stands for Criterion1 of the filter

Cp1 stands for Criterion1 of the profile

If the result of the operation is 1 it means that the result is positive.

Application to Case 1: One Filter/One Application

The previous algorithm as defined fully applies.

Application to Case 2: N Filters/One Application

[F1 ][F2] . . . [FN][Application] are transmitted together. The implicit operation between two filters is the OR operation. This combination of filters can be translated into the following N equations:

(F1:C1 Operator1 P1) Operator11 (F1:C2 Operator2 P2) Operator12 . . . Operator1(n–1) (F1:Cn Operatom Pn)

OR (F2:C1 Operator1 P1) Operato21 (F2:C2 Operator2 P2) Operator22 . . . Operator2(n–1) (F2:Cn Operatom Pn)

OR
OR (Fn:C1 Operator1 P1) Operatorm1 (Fn:C2 Operator2 P2) Operatorm2 . . . Operatorm(n–1) (Fn:Cn Operatom Pn)

where the Operator1 associated to Filter1 may different from Operator1 associated to Filter2 and so on.

If one of the N equations is positive then the global result of the equation is positive.

Application to Case 3: N Filters/One Application With N+1 Contents, the Additional Content Being Dedicated to the Default Content

[Filter1][Content1][Filter2][Content2] . . . [FILTERN][CONTENTN][Default][Default Content]

The implicit operation corresponds to the following equation:

IF (F1:C1 Operator1 P1) Operator11 (F1:C2 Operator2 P2) Operator12 . . . Operator1n–1 (F1:Cn Operatom Pn)=1 then Display Content1 ELSE IF (F2:C1 Operator1 P1) Operator21 (F2:C2 Operator2 P2) Operator22 . . . Operator2n–1 (F2:Cn Operatorn Pn)=1 then Display Content2 ELSE IF (Fn:C1 Operator1 P1) Operatorm1 (Fn:C2 Operator2 P2) Operatorm2 . . . Operatormn–1 (Fn:Cn Operatom Pn)=1 then Display Content. ELSE Display Default Content.

For illustration, here is an example of the profile that is shown in FIG. 3:

P1: Number of children in the family

P2: Type of cars in family

P3: Family Revenue

P4: Mineral water drunk by family etc.

Figure 4:
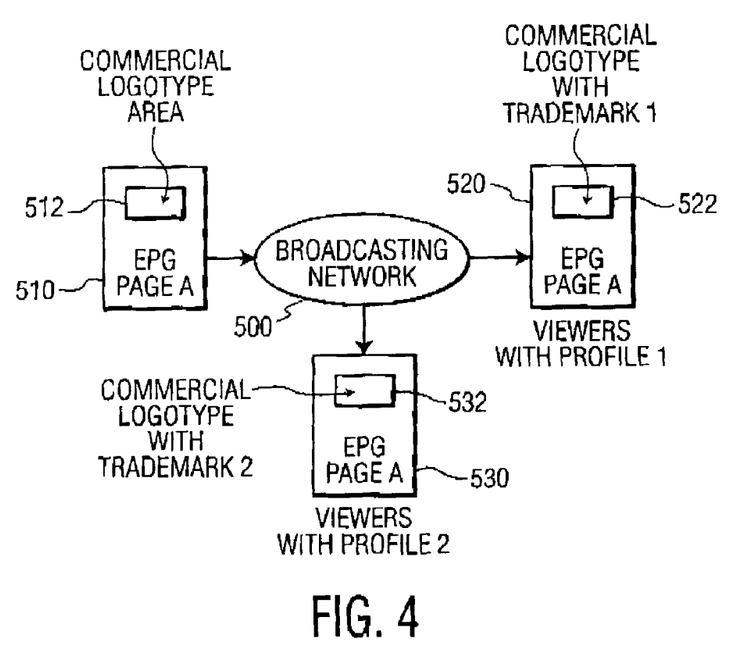
FIG. 4 illustrates an application of the present invention in the commercials inserting a logotype in the EPG for service providers and advertisement agencies.

FIG. 4 illustrates an application of the present invention in the case of insertion of the logotype advertisement that is displayed with an electronic program guide "EPG" mainly dedicated for service providers and advertisement agencies. This logotype may represent for instance a trademark, a design or any other symbols.

The content providers who want to provide interactive programs or to send a specific message to a targeted population through a broadcasting network (500), may address to a selected number of viewers different messages depending on the type of services. For instance, viewers with profile 1 will have an EPG page A (520) with a commercial logotype containing trademark 1 (522) and viewers with profile 2 will have an EPG page A (530) with a commercial logotype containing trademark 1 (532). For such interactive application, it is highly requested not to select a specific terminal by using a physical address but rather by using a sociological profile.

This kind of interactive application applies especially when an interactive commercial generates an off-line action such as sending a mail, sending commercial coupons offering x% discount in a shop, sending a brochure. The possibility to select a population limits the number of people to a population which has a real motivation. Then, the off-line action as a mail, will have a higher efficiency by providing a high quality feedback and the cost will decrease. From the viewer point of view, the interactive audiovisual program will call him for an action only on a program to which he would normally react. He will not be polluted by messages in which he is not interested in.

In another interactive application, advertisement agencies and/or service providers may want to send a specific message to a specific population. Indeed, in order to finance the services provided, more and more service providers insert commercial logotype in the information pages. Services such as Electronic Program Guide and Teletext use the insertion of commercial logotype to finance the service. But, generally the place available on a page for such logotype is limited and a logotype is broadcast to all viewers. The described method allows the presentation of a commercial logotype according to viewer profile using a narrow bandwidth for addressability. For example, an EPG service can broadcast an EPG page with a commercial area which is filled in by different commercial logotypes according to the viewer's profile.

FIG. 5 shows another implementation of the present application wherein the interactive application has different contents depending on TV viewer's profile.

Indeed, a filtering process based on profiles is established from the information collected after the viewers have returned their subscription forms. According to this filtering process, the viewers have access to the same application at the same time but its content may differ. Some part of the application represented by an icon or a text can be linked to filters and its content appears differently according to the result of the comparison between the filters and the viewer's profile stored in the interactive terminal permanent memory. This content may be for example the amount of offered coupons in a commercial message.

As in shown in FIG. 5, on the screen (600) of an interactive terminal, a field of the text may vary according to the profile stored in the terminal. This field is for instance the price or the reduction as it is shown. In this particular case, by comparing the profile stored in the terminal with the three filters, the amount of reduction is different. For Filter 1 (610) the reduction is 5 francs, for Filter 2 (620), the reduction is 10 francs, and for Filter 3 (630), the reduction is 15 francs.

In this implementation, the commercial logotype "Tak" is kept unchanged. But the logotype can vary according to the filter and to the viewer's profile.

It should be kept in mind that the combination of the two functionalities illustrated in FIGS. 4 and 5 is possible so that in that case, not only the logotype that appears on the screen varies according to the viewer's profile and also the content of a part of the text displayed on the screen of the interactive terminal.

What is claimed is:

1. Method for selecting at least a category of viewers in an interactive multimedia system comprising a plurality of interactive terminals, each one containing a memory that stores a viewers profile, a broadcasting network and a return path network said broadcasting network capable of receiving audio/video data and interactive data including a plurality of interactive contents, wherein said interactive data can be executed so as to return back on said return path network a signal; said method comprising the steps of;

registering criteria corresponding to the viewer's profile, wherein said registering criteria are developed by filling out a received electronic form that is requested by the viewer, wherein the electronic form is received from said return path;

transmitting the filled out electronic form via said return path;

receiving audio/video data multiplexed with two or more filters, a script, and said interactive data are associated with said script, wherein each filter corresponds to a criteria set:

comparing said two or more filters to criteria of the viewer's profile stored in an interactive terminal memory, wherein said script controls the comparison of said two or more filters with criteria of the stored viewer's profile; and responsive to said comparison, executing with the interactive terminal one of said interactive contents if the said two or more filters match with said criteria of the stored viewer's profile enabling an interactive connection.

2. The method according to claim 1 wherein said viewer's profile is previously registered using a predefined format and stored in said interactive terminal memory and in a viewer's database.

3. The method according to claim 2 wherein the predefined format of said viewer's profile contains a qualitative criterion and/or a quantitative criterion so as to apply different order relations on each one of said criterion for performing the comparison step.

4. The method according to claim 1 wherein it further comprises executing a default content if none of said filters matches the viewer's profile stored.

5. The method according to claim 1 wherein said interactive contents represent different logotypes.

6. An interactive terminal in an interactive multimedia system comprising a plurality of interactive terminals, each one containing a memory that stores a viewer's profile, a broadcasting network and a return path network, said broadcasting network receiving audio/video data and interactive data including a plurality of interactive contents, wherein said interactive data can be executed so as to return back a signal on said return path network; said interactive terminal comprising:

means for registering criteria corresponding to the viewer's profile, wherein said criteria are developed by filling out a received electronic form that is requested by the viewer;

means for transmitting the filled out electronic form via a return path network;

means for receiving audio/video data multiplexed with two or more filters, a script, and said interactive contents are associated with said script, wherein each filter corresponds to a criteria set;

means for comparing said two or more filters to said viewer's profile stored in the interactive terminal memory wherein said script controls the operators used to compare said two or more filters with criteria of the stored viewer's profile; and means for executing one of said interactive contents if said two or more filters match said criteria of the stored viewer's profile, enabling an interactive connection.

7. The interactive terminal according to claim 6, wherein it further comprises means for executing a default content if none of said filters matches the viewer's profile stored.

8. The interactive terminal of claim 6, wherein said plurality of interactive contents comprise at least one of: a voting function, a game, a brochure command, a survey, a contest, a gambling function, a request for extra information related to a program, and a news function.

9. The interactive terminal of claim 6, wherein said interactive connection, by said interactive terminal, is established y using at least one of: a telephone number, and a physical address of an interactive server.

10. The interactive terminal of claim 6, wherein said responsive to said comparison step matches at least two filters with the viewer's profile for the interactive terminal to execute said Interactive contents.

11. The interactive terminal of claim 6, wherein said interactive contents are used to modify an economic transaction structure in response to said matching filter.

12. The interactive terminal according to claim 6, wherein said viewer's profile is previously registered using a predefined format and stored in said interactive terminal memory and in a viewer's database.

13. The interactive terminal of claim 6, wherein said plurality of interactive contents comprise at least one of: a voting function, a game, a brochure command, a survey, a contest, a gambling function, a request for extra information related to a program, and a news function.

14. The interactive terminal of claim 6, wherein said interactive connection, by said interactive terminal, is established by using at least one of: a telephone number, and a physical address of an interactive server.

15. The interactive terminal of claim 6, wherein said responsive to said means for executing matches at least two filters with the viewer's profile for the interactive terminal to execute said interactive contents.

16. The interactive terminal of claim 6, wherein said interactive contents are used to modify an economic transaction structure in response to said matching filter.

* * * * *

UNITED STATES PATENT AND TRADEMARK OFFICE
CERTIFICATE OF CORRECTION

PATENT NO. : 6,807,675 B1
DATED : October 19, 2004
INVENTOR(S) : Alain Maillard et al.

It is certified that error appears in the above-identified patent and that said Letters Patent is hereby corrected as shown below:

Title page,
Item [56], References Cited, U.S. PATENT DOCUMENTS, should read:

| | | |
|---|---|---|
| -- 5,855,008 | 12/1998 Goldhaber et al. | 705/14 |
| 5,905,865 | 05/1999 Palmer et al. | 725/112 |
| 5,978,381 | 11/1999 Perlman et al. | 370/432 |
| 6,085,229 | 07/2000 Newman et al. | 709/203 |
| 5,602,920 | 02/1997 Bestler et al. | 380/49 |
| 6,285,407 B1 | 09/2001 Yasuki et al. | 348/554 |
| 6,330,610 B1 | 12/2001 Docter et al. | 709/229 |
| 6,345,289 B1 | 02/2002 Lotspeich et al. | 709/203 |
| 6,182,050 B1 | 01/2001 Ballard | 705/14 |
| 6,442,598 B1 | 08/2002 Wright et al. | 709/217 |
| 6,160,570 | 12/2000 Sitnik | 348/1 |
| 6,029,195 | 12/2000 Herz | 709/219 |
| 6,298,482 B1 | 10/2001 Seidman et al. | 725/101 |
| 5,721,583 | 02/1998 Harada et al. | 725/24 |
| 5,915,243 | 06/1999 Smolen, Daniel T. | 725/23 |
| 6,324,519 | 11/2001 Eldering, Charles A. | 705/14 |
| 5,900,905 | 05/1999 Shoff et al. | 709/219 |
| 5,918,014 | 06/1999 Robinson, Gary B. | 709/219 |
| 5,929,850 | 07/1999 Broadwin et al. | 725/110 -- |

Signed and Sealed this

Fourth Day of January, 2005

JON W. DUDAS
*Director of the United States Patent and Trademark Office*